United States Patent [19]
Fukino et al.

[11] Patent Number: 5,166,584
[45] Date of Patent: Nov. 24, 1992

[54] ELECTRIC VEHICLE

[75] Inventors: Masato Fukino, Yokosuka; Namio Irie, Yokohoma; Hideaki Horie; Masato Origuchi, both of Yokosuka, all of Japan

[73] Assignee: Nissan Motor Co., Ltd., Kanagawa, Japan

[21] Appl. No.: 723,019

[22] Filed: Jun. 28, 1991

[30] Foreign Application Priority Data

Jul. 5, 1990 [JP] Japan ............... 2-176218

[51] Int. Cl.$^5$ ............... B60L 15/20
[52] U.S. Cl. ............... 318/139; 180/65.3; 180/65.8
[58] Field of Search ............... 318/139; 361/78, 79, 361/86, 87; 180/65.1, 65.2, 65.3, 65.4, 65.8

[56] References Cited

U.S. PATENT DOCUMENTS

| | | | |
|---|---|---|---|
| 3,792,327 | 2/1974 | Waldorf | 318/139 |
| 3,837,419 | 9/1974 | Nakamura | 180/65 R |
| 3,842,287 | 10/1974 | Nakamura | 318/139 X |
| 3,971,454 | 7/1976 | Waterbury | 318/440 X |
| 4,042,056 | 8/1977 | Horwinski | 180/65 A |
| 4,095,665 | 6/1978 | Armfield | 318/139 |
| 4,099,589 | 7/1978 | Williams | 180/65 A |
| 4,137,557 | 1/1979 | Ciarniello et al. | 361/92 |
| 4,218,717 | 8/1980 | Shuster | 361/79 |
| 4,438,342 | 3/1984 | Kenyon | 290/45 |

FOREIGN PATENT DOCUMENTS 55-157901 12/1980 Japan.
63-64503 3/1988 Japan.

Primary Examiner—Bentsu Ro
Attorney, Agent, or Firm—Pennie & Edmonds

[57] ABSTRACT

In an electric vehicle driven by an electric motor, a battery accumulator supplies electricity to the electric motor and a plurality of auxiliaries. A generating unit generates electricity in order to charge the battery accumulator. A detector unit detects at least one of various running conditions of the vehicle. A control unit supplies the electricity from the generating unit directly to the electric motor when the detected running condition indicates an overload condition, and gradually reduces the electricity supplied to the auxiliaries.

5 Claims, 5 Drawing Sheets

AT TIME LOAD AMOUNT IS LARGE

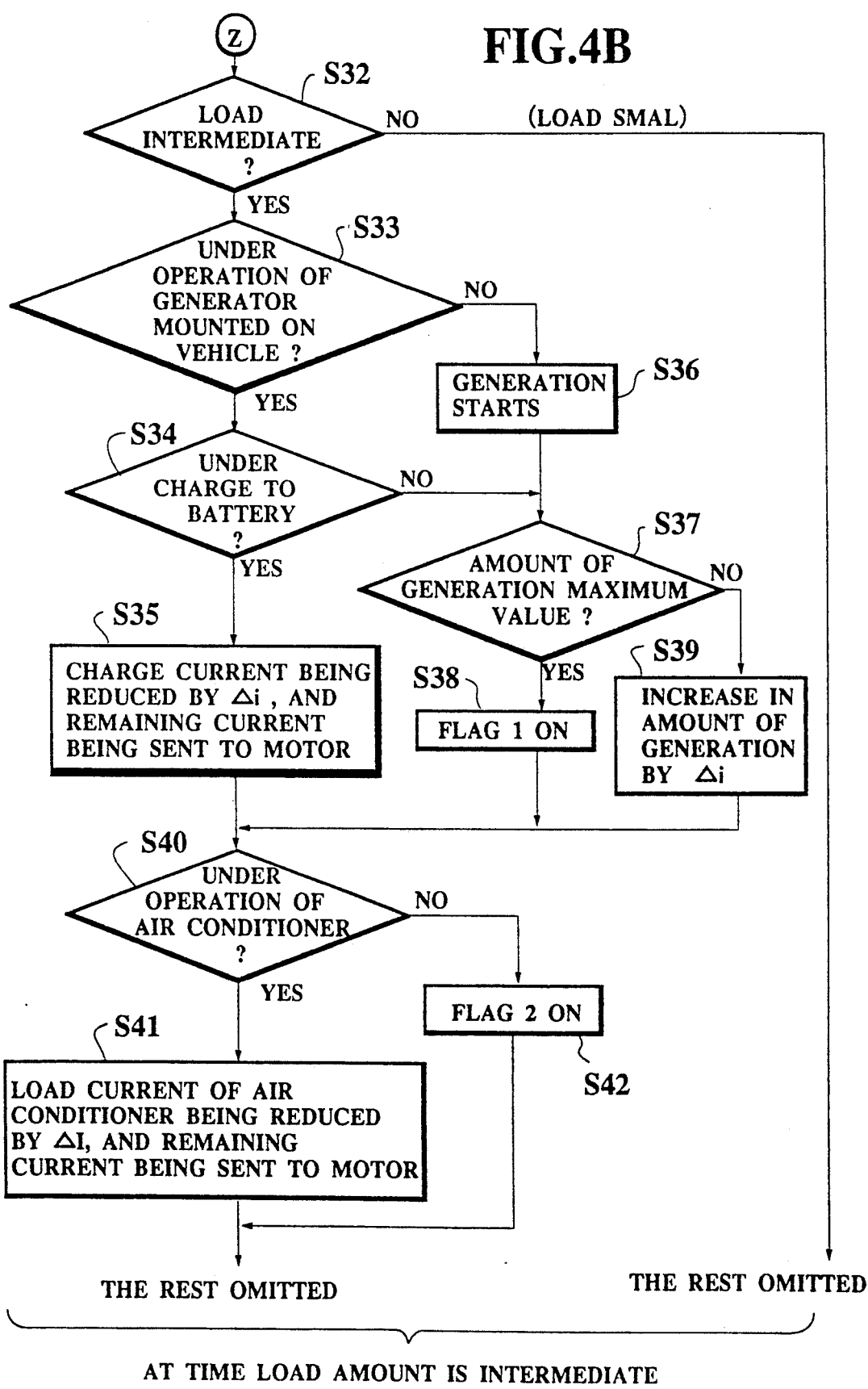

ELECTRIC VEHICLE

BACKGROUND OF THE INVENTION

The present invention relates to an electric vehicle such as, for example, an electric automobile which is driven by an electric motor.

As a conventional electric vehicle, there is one as disclosed, for example, in Japanese Patent Laid-Open No. SHO 55-157901. The conventional electric vehicle is arranged such that a generator is mounted on the vehicle as a drive source for an electric motor, in addition to a battery. The battery is charged by the generator, and the electric motor is driven by electric supply from the battery to cause the vehicle to travel.

However, the above-described conventional electric vehicle has the following problem. Specifically, in the case where an electric load on the electric motor is high such as time of acceleration of the vehicle and time of climbing of a slope thereof, if electric loads on respective accessories or auxiliaries such as, for example, an air conditioner, a heater, a defroster and the like are large, an accelerating force and a force for climbing a slope become insufficient.

There is such an arrangement that an air compressor for the air conditioner is cut off by an electromagnetic clutch at acceleration, for example. In this case, however, there is the following problem. That is, since an amount of electric load varies discontinuously by abrupt cutting-off of the air compressor, acceleration becomes discontinuous. Thus, there cannot be produced a feeling of smooth acceleration.

SUMMARY OF THE INVENTION

It is therefore an object of the invention to provide an electric vehicle in which amounts of load on respective auxiliaries decrease gradually at acceleration or at climbing of a slope, and an amount of electricity supplied to a electric motor is largely secured, thereby enabling accelerating performance and slope-climbing performance to be further improved.

According to the invention, there is provided an electric vehicle comprising: an electric motor for driving the vehicle; a plurality of auxiliaries mounted on the vehicle; a battery accumulator for supplying electricity to said electric motor and said auxiliaries; generating means for generating electricity in order to charge said battery accumulator; detector means for detecting at least one of running conditions of the vehicle; and control means for supplying the electricity from said generating means directly to said electric motor and for gradually reducing the electricity supplied to said auxiliaries when the detected running condition indicates an overload condition.

With the above arrangement, the electricity is supplied from the generating means directly to the electric motor in view of the overload running condition detected by the detecting means. The amount of electricity supplied to the auxiliaries is gradually reduced.

As will be clear from the above description, with the arrangement of the invention, the amounts of load on the respective auxiliaries are gradually reduced at acceleration and at climbing of a slope, and the electricity is supplied from the generator directly to the electric motor, whereby it is possible to drive the electric motor with a large power. Thus, shock is less, and acceleration performance and slope-climbing performance can be improved.

BRIEF DESCRIPTION OF THE DRAWINGS

FIGS. 4A and 4B are another embodiment of a flow chart of the present invention.

DESCRIPTION OF THE EMBODIMENTS

Figure 1:
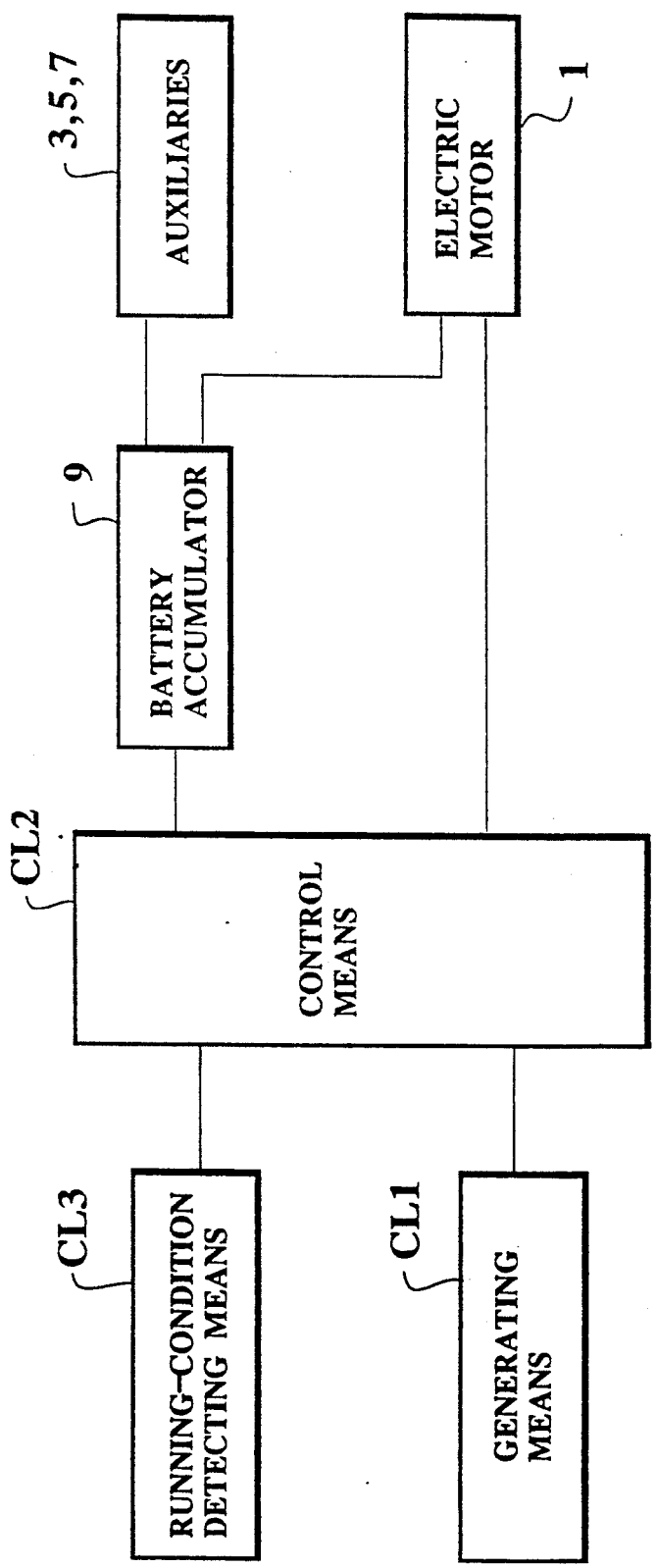
FIG. 1 is a block diagram of the present invention.
Figure 2:
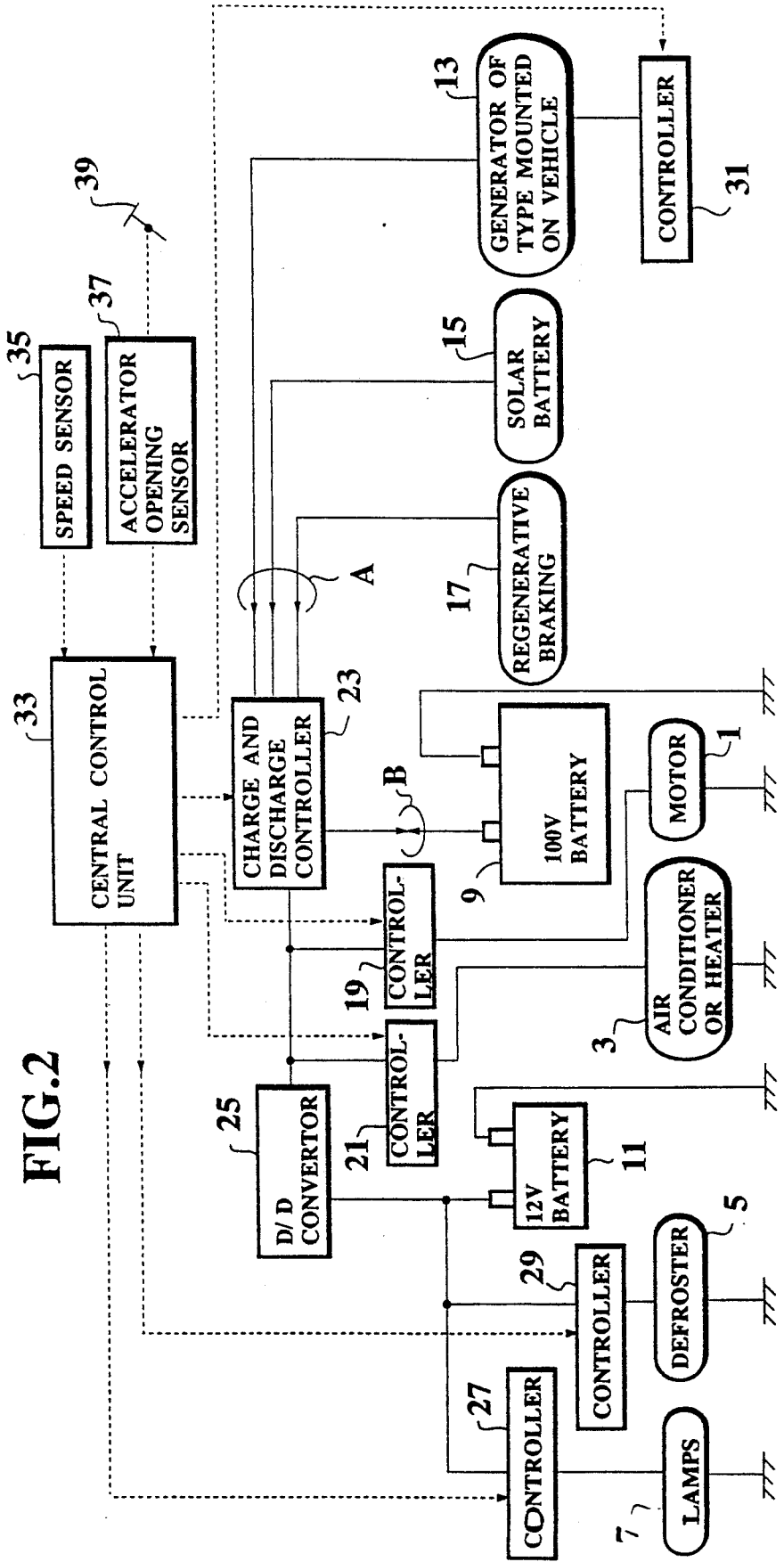
FIG. 2 is a detailed block diagram of FIG. 1.

Referring to FIG. 2, mounted on an electric vehicle such as, for example, an electric automobile according to the embodiment are an electric motor 1 for driving the electric vehicle to run, various auxiliaries such as a heater or an air conditioner 3, a defroster 5, a plurality of lamps 7 and the like, a battery accumulator including a pair of batteries 9 and 11 that are electric power sources for the electric motor 1 and the auxiliaries 3, 5 and 7, and the aforementioned generator means CL1 shown in FIG. 1 including a generator 13, a solar battery 15, regenerative braking 17 and the like.

The electric motor 1 and the air conditioner 3 are connected to a charge and discharge controller 23 through their respective controllers 19 and 21. Connected to the charge and discharge controller 23 are the battery 9, the generator 13, the solar battery 15 and the regenerative braking 17. A controller 31 is connected to the generator 13. Further, the battery 11 is connected to the charge and discharge controller 23 through a D/D (digital-digital) converter 25. The defroster 5 and the lamps 7 are connected to the battery 11 through their respective controllers 29 and 27.

From the battery 9, output voltage of, for example, D.C. 100 V, is taken out to drive the electric motor 1 and the air conditioner 3. On the other hand, from the battery 11, output voltage of, for example, D.C. 12 V is taken out to drive the defroster 5 and the lamps 7. The voltage from the battery 9 is reduced from 100 V to 12 V by the D/D converter 25.

The charge and discharge controller 23 and the controllers 19, 21, 27, 29 and 31 are connected to an output port of a central control unit 33 which serves as the aforesaid control means CL2 illustrated in FIG. 1. The charge and discharge controller 23 controls an amount of generation A due to the generator 13, the solar battery 15 and the regenerative braking 17, an amount of charge and discharge B of the battery 9, and an amount of electric load C on the electric motor 1, the air conditioner 3, the defroster 5 and the lamps 7, correspondingly to an output signal from the central control unit 33.

The controllers 19, 21, 27 and 29 control their respective electric loads on the electric motor 1, the air conditioner 3, the defroster 5 and the lamps 7 correspondingly to the output signal from the central control unit 33. The controller 31 controls operation of the generator 13. A speed sensor 35 and an accelerator opening sensor 37 are connected to an input port of the central control unit 33. The speed sensor 35 takes in a signal from, for example, a speed meter to detect a speed of the vehicle. The accelerator opening sensor 37 takes in a signal from, for example, detecting inclination of an accelerator pedal to detect opening of an accelerator 39. In the embodiment, the speed sensor 35 and the accelerator opening sensor 37 cooperate with each other to form the aforementioned running-condition detecting means CL3, shown in FIG. 1, for detecting at least one of various running conditions of the vehicle.

Figure 3:
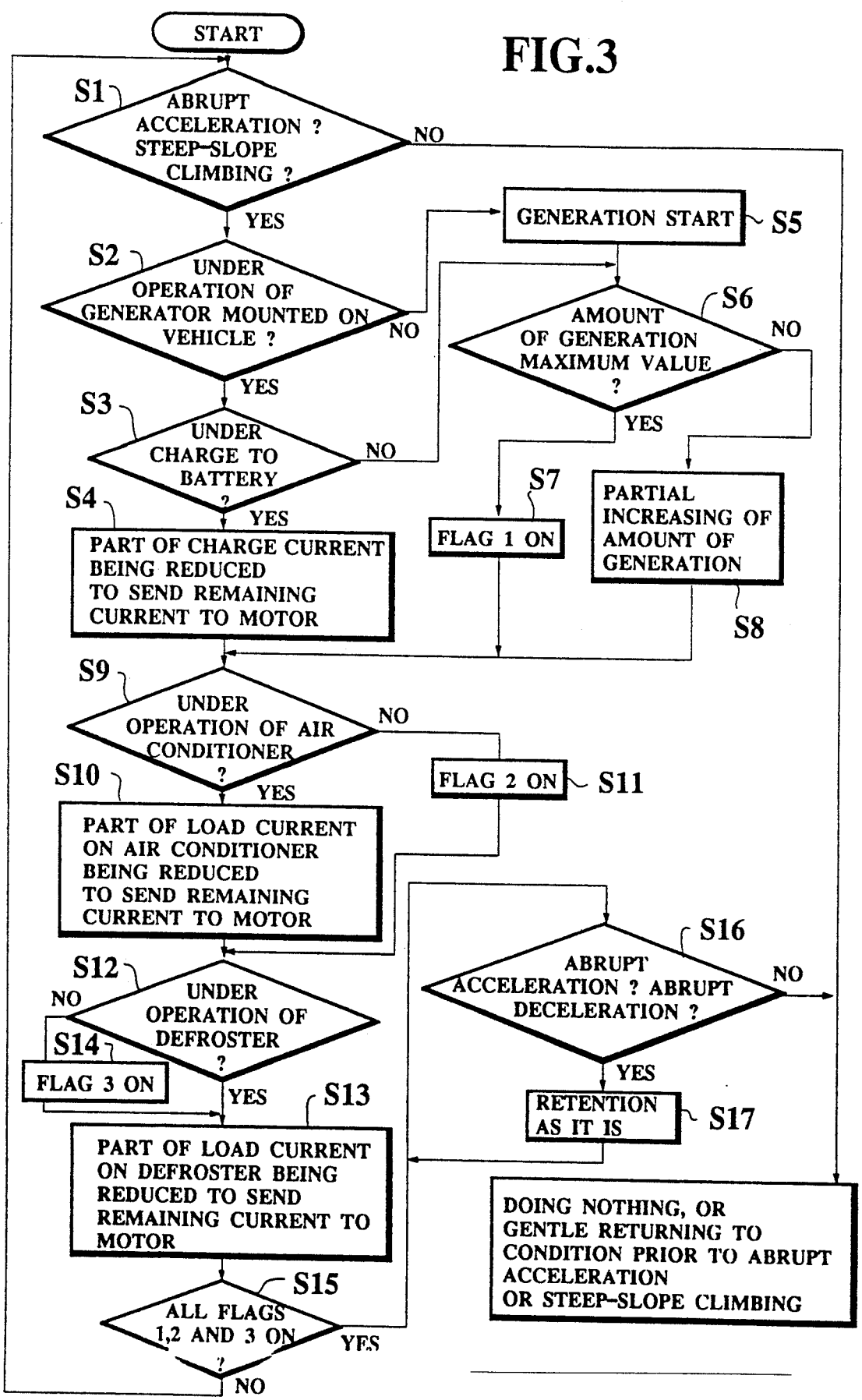
FIG. 3 is a flow chart on the basis of the block diagram illustrated in FIG. 2.

The operations of the above-described embodiment will be described on the basis of a flow chart shown in FIG. 3.

Under running of the vehicle, it is first discriminated at the step S1 whether or not the vehicle is under a sudden or abrupt accelerating condition or under a steep-slope climbing condition on the basis of a detecting signal from the accelerator opening sensor 37. This discrimination is used to determine whether or not the load on the electric motor 1 is under a high-load condition. For example, it is judged that the vehicle is under the abrupt accelerating condition or under the steep-slope climbing condition in the case, for example, where opening of the accelerator 39 is equal to or more than a predetermined value.

Here, in the case where it is not judged that the vehicle is under the abrupt accelerating condition or under the steep-slope climbing condition, the vehicle runs on the flat grade or the like. Accordingly, an amount of electricity supplied to the electric motor 1 from the battery 9 is controlled on the basis of a signal from the accelerator opening sensor 37. When an amount of electricity charged to the battery 9 is brought to a value less than a predetermined setting value, the generator 13 is rendered operative by an output signal from the controller 31 to initiate generation to charge the battery 9 with the generated electricity.

In the case where it is judged at the step S1 that the vehicle is under the abrupt accelerating condition or under the steep-slope climbing condition, the electric motor 1 is under a high-load condition and, accordingly, it is discriminated at the step S2 whether or not the generator 13 is under operation. In the case where the generator 13 operates, it is discriminated at a step S3 whether or not the battery 9 is under being charged. In the case where the battery 9 is under being charged, current charged to the battery 9 is gradually reduced in order to increase current supplied to the electric motor 1, and supply of the current is generally switched to the electric motor 1 at the step S4. Further, in the case where the generator 13 does not operate at the step S2, a program proceeds to the step S5 where the generator 13 is rendered operative to initiate generation. At the step S6, it is discriminated whether or not an amount of generation of the generator 13 is a maximum value. When it is judged that the amount of generation is the maximum value, a flag 1 is raised at the step S7, and the program proceeds to the step S9. Furthermore, when it is judged that the amount of generation is not the maximum value, the amount of generation increases at a step S8, and the program proceeds to the step S9.

Subsequently, it is discriminated at the step S9 whether or not the air conditioner 3 is under operation. In the case where the air conditioner 3 is under operation, current supplied to the air conditioner 3 is gradually reduced in order to increase the current supplied to the electric motor 1, and supply of the current is gradually switched to the electric motor 1 at the step S10. In the case where the air conditioner 3 does not operate, a flag 2 is raised at the step S11, and the program proceeds to a step S12. At the step S12, it is discriminated whether or not the defroster 5 is under operation. In the case where the defroster 5 is under operation, current supplied to the defroster 5 is gradually reduced in order to increase the current supplied to the electric motor 1, and supply of the current is gradually switched to the electric motor 1 at a step S13. In the case where the defroster 5 does not operate, a flag 3 is raised at the step S14, and the program proceeds to the step S15. At the step S15, it is discriminated whether or not the flags 1, 2 and 3 are all raised. In the case where the flags 1, 2 and 3 are all raised, the auxiliaries such as the air conditioner 3, the defroster 5 and the like are halted, and the battery 9 is not also charged. Accordingly, of the maximum amount of generated output by the generator 13 is supplied to the electric motor 1, and the latter is under such a condition as to output its maximum power. Accordingly, the program proceeds to the step S16 where it is discriminated whether or not the vehicle is under the abrupt accelerating condition or under the steep-slope climbing condition. Here, when the vehicle is under the abrupt accelerating condition or under the steep-slope climbing condition, the control condition is maintained as it is at the step S17. When the vehicle is not under the abrupt accelerating condition or under the steep-slope climbing condition, control at normal or ordinary running is conducted with respect to the vehicle.

Moreover, in the case where all the flags 1, 2 and 3 are not raised at the step S15, the program is returned to the step S1, and a flow is repeated.

In this manner, when the amount of load on the electric motor 1 is large such as time of abrupt acceleration or time of steep-slope climbing, the amounts of load on the respective auxiliaries such as the air conditioner 3, the defroster 5 and the like are gradually reduced, and the current charged to the battery 9 is switched gradually to the electric motor 1. Further, the generated current of the generator 13 is supplied to the electric motor 1 to gradually increase the current supplied to the electric motor 1. Thus, it is possible to secure the maximum amount of electricity supplied to the electric motor 1.

Accordingly, the amount of generated output and the amount of load can be controlled substantially continuously in accordance with at least one of the various running conditions of the vehicle, making it possible to further improve to accelerating performance and the slope-climbing performance.

Figure 4A:
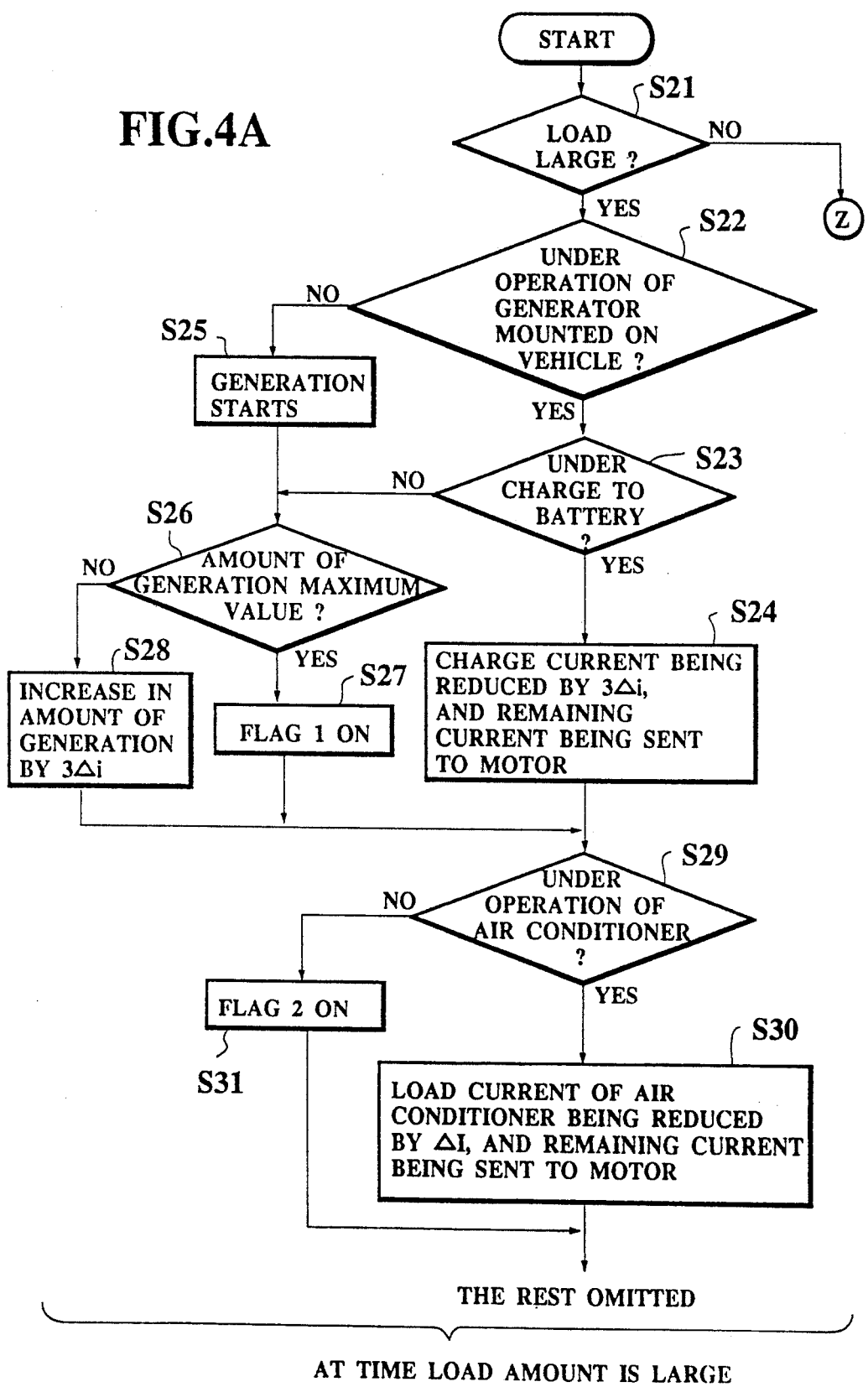

FIGS. 4A and 4B show a flow chart relating to another embodiment of the invention, with parts omitted.

The embodiment is arranged such that an increasing rate of the amount of generated output of the generator and a reducing rate of the current supplied to the auxiliaries such as the air conditioner and the like are changed in accordance with a degree of the abrupt accelerating condition or the steep-slope climbing condition, that is, in accordance with a magnitude of the amount of load on the electric motor.

In this embodiment, when the amount of load on the electric motor is large, generating current increases by $3\Delta i$ per one cycle of computation by a microcomputer. This corresponds to three times of an increasing speed $\Delta i$/cycle at the time the amount of load on the electric motor 1 is an intermediate degree. On the other hand, a decreasing speed of the battery charge current and a decreasing speed of load current on the air conditioner at the time the amount of load on the electric motor is large are brought to $3\Delta i$/cycle, namely, three times of the decreasing speed $\Delta i$/cycle at the time the amount of load on the electric motor is the intermediate degree.

That is, it is first discriminated at the step S21 whether or not the amount of load on the electric motor 1 is large. When it is judged that the amount of load is larger than a predetermined value, a program proceeds to the step S22 where it is discriminated whether or not the generator 13 is under operation. In the case where the generator 13 is under operation, it is discriminated at the step S23 whether or not the battery 9 is being charged. In the case where the battery 9 is being charged, the current charged to the battery 9 is reduced gradually at $3\Delta i/cycle$ in order to increase the current supplied to the electric motor 1, and supply of the current is gradually switched to the electric motor 1 at the step S24. Further, in the case where the generator 13 is not under operation at the step S22, the program proceeds to the step S25 where the generator 13 is rendered operative to initiate generation. At the step S26, it is discriminated whether or not an amount of generated output by the generator 13 is the maximum value. When it is judge that the amount of generated output is the maximum value, the flag 1 is raised at a step S27, and the program proceeds to the step S29. Furthermore, when it is judged that the amount of generated output is not the maximum value, the amount of generated output gradually increases at $3\Delta i/cycle$ at the step S28, and the program proceeds to the step S29.

Subsequently, at the step S29, it is discriminated whether or not the air conditioner 3 is under operation. In the case where the air conditioner 3 is under operation, the current supplied to the air conditioner 3 is reduced gradually at $3\Delta i/cycle$ in order to increase the current supplied to the electric motor 1, and supply of the current is switched to the electric motor 1 at the step S30. In the case where the air conditioner 3 is not under operation, the flag 2 is raised at the step S31, and the program proceeds to subsequent steps (not shown in the figure).

Furthermore, when it is judged at the step S21 that the amount of load on the electric motor 1 is not larger than the predetermined value, the program proceeds to the step S32 where it is discriminated whether or not the amount of load on the electric motor 1 is an intermediate degree. When it is judged that the amount of load is the intermediate degree, the program proceeds to the step S33 where it is discriminated whether or not the generator 13 is under operation. In the case where the generator 13 is under operation, it is discriminated at the step S34 whether or not the battery 9 is being charged. In the case where the battery 9 is gradually reduced at $\Delta i/cycle$ in order to increase the current supplied to the electric motor 1, and supply of the current is gradually switched to the electric motor 1 at the step S35. Moreover, when the generator 13 is not under operation at the step S33, the program proceeds to a step S36 where the generator is rendered operative to initiate generation. At the step S37, it is discriminated whether or not the amount of generated output by the generator 13 is the maximum value. When it is judged that the amount of generated output is the maximum value, the flag 1 is raised at a step S38, and the program proceeds to the step S40. Further, when it is judged that the amount of generated outout is not the maximum value, the amount of generation increases gradually at $\Delta i/cycle$ at the step S39, and the program proceeds to the step S40.

Subsequently, at the step S40, it is discriminated whether or not the air conditioner 3 is under operation. In the case where the air conditioner 3 is under operation the current supplied to the air conditioner 3 is gradually reduced at $\Delta i/cycle$ in order to increase the current supplied to the electric motor 1, and supply of the current is gradually switched to the electric motor 1 at the step S41. In the case where the air conditioner 3 is not under operation, the flag 2 is raised at the step S42, and the program proceeds to subsequent steps (not shown in the figure).

At the steps S31 and S42, the current supplied to the defroster 5 is reduced at a decreasing rate similar to the case of the air conditioner 3, and supply of the current is switched to the electric motor 1 to increase the current supplied thereto.

Furthermore, in the case where the amount of load on the electric motor 1 is not the intermediate degree at the step S32, this indicates that the vehicle is under the normal condition in which the amount of load is small. Accordingly, control at normal running is conducted similarly to the embodiment mentioned previously.

Thus, according to the embodiment, it is possible to improve accelerating performance and slope-climbing performance more quickly or rapidly.

What is claimed is:

1. An electric vehicle comprising:
an electric motor for driving the vehicle;
a plurality of auxiliaries mounted on the vehicle;
a battery accumulator for supplying electricity to said electric motor and said auxiliaries;
generating means for generating electricity in order to charge said battery accumulator;
detector means for detecting at least one of running conditions of the vehicle, including a speed sensor for detecting a speed of the vehicle and an accelerator opening sensor for detecting opening of an accelerator; and
control means for controlling the supply of the electricity from said generating means directly to said electric motor and for gradually reducing the electricity supplied to said auxiliaries when the detected running condition indicates the opening of said accelerator indicative of acceleration and/or overload caused by a high-grade incline climbing.

2. An electric vehicle according to claim 1, wherein said auxiliaries include an air conditioner, a defroster and a plurality of lamps.

3. An electric vehicle according to claim 1, wherein said generating means includes a generator mounted on the vehicle.

4. An electric vehicle according to claim 3, wherein said generating means includes a solar battery and a regenerative brake in addition to said generator.

5. An electric vehicle according to claim 1, wherein said control means is arranged so that an increasing rate of an amount of generated output by said generating means and a reducing rate of current supplied from said generating means to said auxiliaries are changed in accordance with a magnitude of an amount of load on said electric motor.

* * * * *